US007338648B2

(12) United States Patent
Harutyunyan et al.

(10) Patent No.: US 7,338,648 B2
(45) Date of Patent: Mar. 4, 2008

(54) METHOD FOR LOW TEMPERATURE SYNTHESIS OF SINGLE WALL CARBON NANOTUBES

(75) Inventors: Avetik Harutyunyan, State College, PA (US); Bhabendra K. Pradhan, State College, PA (US); Peter C. Eklund, Boalsburg, PA (US)

(73) Assignee: The Penn State Research Foundation, University Park, PA (US)

( * ) Notice: Subject to any disclaimer, the term of this patent is extended or adjusted under 35 U.S.C. 154(b) by 231 days.

(21) Appl. No.: 10/326,276

(22) Filed: Dec. 23, 2002

(65) Prior Publication Data

US 2004/0091416 A1 May 13, 2004

Related U.S. Application Data

(60) Provisional application No. 60/344,215, filed on Dec. 28, 2001.

(51) Int. Cl.
*B82B 3/00* (2006.01)
(52) U.S. Cl. .................................. 423/447.3; 977/843
(58) Field of Classification Search ............. 423/447.3; 977/843
See application file for complete search history.

(56) References Cited

U.S. PATENT DOCUMENTS

| | | | |
|---|---|---|---|
| 4,663,230 A | 5/1987 | Tennent | |
| 4,855,091 A | 8/1989 | Geus et al. | |
| 5,149,584 A | 9/1992 | Baker et al. | |
| 5,165,909 A | 11/1992 | Tennent et al. | |
| 5,547,748 A | 8/1996 | Ruoff et al. | |
| 5,593,740 A | 1/1997 | Strumban et al. | |
| 5,653,951 A | 8/1997 | Rodriguez et al. | |
| 5,780,101 A | 7/1998 | Nolan et al. | |
| 5,866,434 A | 2/1999 | Massey et al. | |
| 5,872,422 A | 2/1999 | Xu et al. | |
| 5,973,444 A | 10/1999 | Xu et al. | |
| 5,997,832 A | 12/1999 | Lieber et al. | |
| 6,099,965 A | 8/2000 | Tennent et al. | |
| 6,333,016 B1 | 12/2001 | Resasco et al. | |
| 6,413,487 B1 * | 7/2002 | Resasco et al. | .......... 423/447.3 |

FOREIGN PATENT DOCUMENTS

EP 0056004 B1 1/1986

OTHER PUBLICATIONS

Nelly M. Rodriguez et al., "Catalytic Engineering of Carbon Nanostructures", Langmuir 1995, vol. 11, pp. 3862-3866.
"Is it all just a pipe dream?" Nature, vol. 410, Apr. 12, 2001, pp. 734-735.
Jing Kong, et al., "Chemical vapor deposition of methane for single-walled carbon nanotubes", Chemical Physics Letters 292, Aug. 14, 1998, pp. 567-574.
Rahul Sen, et al., "Metal-Filled and Hollow Carbon Nanotubes Obtained by the Decomposition of Metal-Containing Free Precursor Molecules", 1997 American Chemical Society.
S. Huang, et al., "Patterned Growth and Contact Transfer of Well-Aligned Carbon Nanotube Films", J. Phys. Chem. B 1999, 103, 4223-4227.
S. Iijima, "*Helical Microtubules of Graphitic Carbon*," Nature International Weekly Journal of Science, vol. 352, No. 6348, Nov. 7, 1991, pp. 56-60.
T.W. Ebbesen, et al. "*Large-Scale Synthesis of Carbon Nanotubes*" Nature International Weekly Journal of Science, vol. 358, Jul. 16, 1992, pp. 220-222.
A. Thess, et al, "*Crystalline Ropes of Metallic Carbon Nanotubes*" Nature International Weekly Journal of Science, vol. 273, No. 6383, Jul. 26, 1996, pp. 402, 483-487.
Z.F. Ren, et al, "*Synthesis of Large Arrays of Well-Aligned Carbon Nanotubes on Glass*" American Association for the Advancement of Science, vol. 282, No. 5391, Nov. 6, 1998, pp. 1105-1107.
M. Endo, et al, "*Pyrolytic Carbon Nanotubes from Vapor-Grown Carbon Fibers*" Carbon, Special Issue on Nanotubes, vol. 33, No. 7, 1995, pp. 873-881.
M. Terrones, et al, "*Controlled Production of Aligned-Nanotube Bundles*" Nature International Weekly Journal of Science, vol. 388, No. 6637, Jul. 3, 1997, pp. 52-55.
P.M. Ajayan, et al, "*Aligned Carbon Nanotube Arrays Formed by Cutting a Polymer Resin-Nanotube Composite*" American Association for the Advancement of Science, vol. 265, pp. 1212-1214.
Walt A. De Heer, et al, "*Aligned Carbon Nanotube Films: Production and Optical and Electronic Properties*" American Association for the Advancement of Science, vol. 268, May 12, 1995, pp. 845-847.
W.Z. Li, et al, "*Large-Scale Synthesis of Aligned Carbon Nanotubes*" American Association for the Advancement of Science, vol. 274, Dec. 6, 1996, pp. 1701-1703.
M. Kusunoki, et al, "*Epitaxial Carbon Nanotube Film Self-Organized by Sublimation Decomposition of Silicon Carbide*" Applied Physics Letters, vol. 17, No. 13, Nov. 3, 1997, pp. 2620-2622.
R. Andrews, et al, "*Continuous Production of Aligned Carbon Nanotubes: A Step Closer to Commercial Realization*" Chemical Physics Letter, vol. 303, Apr. 16, 1999, pp. 467-474.
C. Liu, et al, "*Synthesis of Macroscopically Long Ropes of Well-Aligned Single-Walled Carbon Nanotubes*" Advanced Materials, vol. 12, No. 16, Aug. 16, 2000, pp. 1190-1192.

(Continued)

*Primary Examiner*—Stuart Hendrickson
(74) *Attorney, Agent, or Firm*—McDermott Will & Emery LLP

(57) ABSTRACT

The present invention is directed towards a method of producing single wall carbon nanotubes which comprises providing a catalyst comprising an alumina support and a component selected from the group consisting of reduced Fe, reduced Fe/Mo, Fe oxide, and Fe/Mo oxide, and growing, in an inert atmosphere, single wall carbon nanotubes by passing a gas comprising methane over the catalyst at a temperature and for a time sufficient to grow single wall carbon nanotubes. The invention is also directed towards a single wall carbon nanotube produced by such a method. The invention is also directed towards a catalyst for producing SWNTs, wherein the catalyst comprises an alumina support and a component selected from the group consisting of reduced Fe, reduced Fe/Mo, Fe oxide, and Fe/Mo oxide.

14 Claims, 7 Drawing Sheets

OTHER PUBLICATIONS

M. Yudasaka, et al, "Nitrogen-Containing Carbon Nanotube Growth from Ni Phthalocyanine by Chemical Vapor Deposition" Carbon, vol. 35, No. 2, 1997, pp. 195-201.

X.B. Wang, et al, "Honeycomb-Like Alignments of Carbon Nanotubes Synthesized by Pyrolysis of a Metal Phthalocyanine" Applied Physics A Materials Science and Processing, vol. 71, No. 3, Sep. 2000, pp. 1-2.

K. Suenaga, et al, "Radically Modulated Nitrogen Distribution in $CN_x$ Nanotubular Structures Prepared by CVD Using Ni Phthalocyanine" Chemical Physics Letters, vol. 316, Jan. 21, 2000, pp. 365-372.

B.K. Pradhan, et al, "Nickel Nanowires of 4 nm Diameter in the Cavity of Carbon Nanotubes", Chemical Communications, Royal Society of Chemistry, No. 13, Jul. 7, 1999, pp. 1317-1318.

S. Fan, et al, "Self-Oriented Regular Arrays of Carbon Nanotubes and Their Field Emission Properties" vol. 283, Jan. 22, 1999, pp. 512-514.

C. J. Lee, et al, "Synthesis of Uniformly Distributed Carbon Nanotubes on a Large Area of Si Substrates by Thermal Chemical Vapor Deposition" Applied Physics Letters, vol. 75, No. 12, Sep. 20, 1999, pp. 1721-1723.

Z. F. Ren, et al, "Growth of a Single Freestanding Multiwall Carbon Nanotube on Each Nanonickel Dot" Applied Physics Letters, vol. 75, No. 8, Aug. 23, 1999, pp. 1086-1088.

C. Park, et al, "Catalytic Behavior of Graphite Nanofiber Supported Nickel Particles. 2. The Influence of the Nanofiber Structure" The Journal of Physical Chemistry B, vol. 102, 1998, pp. 5168-5177.

R. Gao, et al, "Kinetically Controlled Growth of Helical and Zigzag Shapes of Carbon Nanotubes", The Journal of Physical Chemistry B, vol. 104, 2000, pp. 1227-1234.

A.R. Harutyunyan, et al, "Hyperfine Structure in the EPR Spectra of an Organometallic Magnet Based on Doped Cobalt Phthalocyanine" Chemical Physics Letters, vol. 246, No. 6, Dec. 6, 1995, pp. 615-618.

P.C. Eklund, et al, "Vibrational Modes of Carbon Nanotubes,; Spectroscopy and Theory" Carbon, vol. 33, No. 5, 1995, pp. 959-972.

J. M. Assour, et al, "Electron Spin Resonance of α- and β-Cobalt Phthalocyanine" Journal of the American Chemical Society, vol. 87, No. 2, Jan. 20, 1965.

Bethune, et al., Cobalt-catalyzed Growth of Carbon Nanotubes With Single Atomic Layer Walls, Nature (1993) 363 (6430), 605-607.

Charlier, J.C. and Iijima, S. Growth Mechanisms of Carbon Nanotubes, Carbon Nanotubes, (2001) Springer-Verlag, Berlin, 80, 55-81.

Dai, H. Single-Wall Nanotubes Produced By Metal-Catalyzed Disproportionation of Carbon Monoxide, Chemical Physics Letters (1996) 260 (3/4), 471-5.

Dai, Hogjie Nanotube Growth and Characterization, Carbon Nanotubes, (2001) Springer-Verlag, Berlin, 80, 29-53.

Nikolaev, P. et al., Gas-phase Catalytic Growth of Single-Walled Carbon Nanotubes From Carbon Monoxide, Chemical Physics Letters (1999) 313 (1/2), 91-7.

Seidel, R. Chemical Vapor Deposition Growth of Single-Walled Carbon Nanotubes at 600 Degree C and a Simple Growth Model, Journal of Physical Chemistry B (2004) 108 (6), 1888-93.

Farhat, et al, Diameter Control of Single-Walled Carbon Nanotubes Using Argon-Helium Mixture Gases, Journal of Chemical Physics (2001) 115 (14), 6752-9.

Franklin, N.R. An Enhanced CVD Approach To Extensive Nanotube Networks with Directionality, Advanced Materials (2000) 12 (12), 890-4.

Kitiyanan, B. et al., Controlled Production of Single-wall Carbon Nanotubes by Catalytic Decomposition of CO on bimetallic Co-Mo Catalysts, Chemical Physics Letters (2000) 317 (3/5), 497-503.

Kong, J. et al., Synthesis of Single-Walled Carbon Nanotubes on Patterned Silicon Wafers, Nature (1998) 395 (6705), 878-881.

Li, Y.M. Growth of Single-Walled Carbon Nanotubes From Discrete Catalytic Nanoparticles of Various Sizes, Journal of Physical Chemistry B (2001) 105 (46), 11424-11431.

Liao, H.W. Low-temperature Single-wall Carbon Nanotube Synthesis by Thermal Chemical Vapor Deposition, Journal of Physical Chemistry B (2004) 108 (22), 6941-43.

\* cited by examiner

METHOD FOR LOW TEMPERATURE SYNTHESIS OF SINGLE WALL CARBON NANOTUBES

This application claims the benefit of U.S. Provisional Application 60/344,215 which was filed on Dec. 28, 2001, said application being incorporated by reference in its entirety.

BACKGROUND OF THE INVENTION

Single wall carbon nanotubes (SWNTs) were first discovered by scientists at NEC and IBM in 1993. Today SWNTs are synthesized by three main methods: arc discharge, pulsed laser vaporization, and chemical vapor deposition. The growing interest in SWNTs for applications and for fundamental science demands new approaches and flexibility for the synthesis. Chemical vapor deposition (CVD) is considered by many to be the only viable approach for a large scale production of SWNTs. As a result, research is underway to optimize the CVD approach, i.e., to investigate the effect of the catalyst composition, variation of supporting/substrate materials, synthesis temperature and hydrocarbon gases. Co—Mo metal catalysts have been found recently to be able to selectively produce SWNTs at 700° C. using carbon monoxide as the carbon source. Fe/Mo bimetallic catalysts have also been evaluated for SWNT production from methane at high temperatures 900° C. Synthesis of SWNTs at temperatures between 700 and 850° C. by catalytic decomposition of carbon monoxide and ethylene on alumina supported Fe/Mo catalysts has also been reported.

SUMMARY OF THE INVENTION

Single wall carbon nanotubes can be synthesized using chemical vapor deposition (CVD) under methane gas flowing at temperatures as low as 600° C., preferably the temperature is at least 650° C., and more preferably the temperature is at least 680° C., and at most less than 900° C., using an alumina supported Fe— or Fe/Mo containing catalyst.

The present invention is directed towards a method of producing single wall carbon nanotubes which comprises providing a catalyst comprising an alumina support and a component selected from the group consisting of reduced Fe, reduced Fe/Mo, Fe oxide, and Fe/Mo oxide, and growing, in an inert atmosphere, single wall carbon nanotubes by passing a gas comprising methane over the catalyst at a temperature and for a time sufficient to grow single wall carbon nanotubes.

The invention is also directed towards a single wall carbon nanotube produced by such a method.

The invention is also directed towards a catalyst for producing SWNTs, wherein the catalyst comprises an alumina support and a component selected from the group consisting of reduced Fe, reduced Fe/Mo, Fe oxide, and Fe/Mo oxide.

DETAILED DESCRIPTION OF THE INVENTION

Figure 1A:
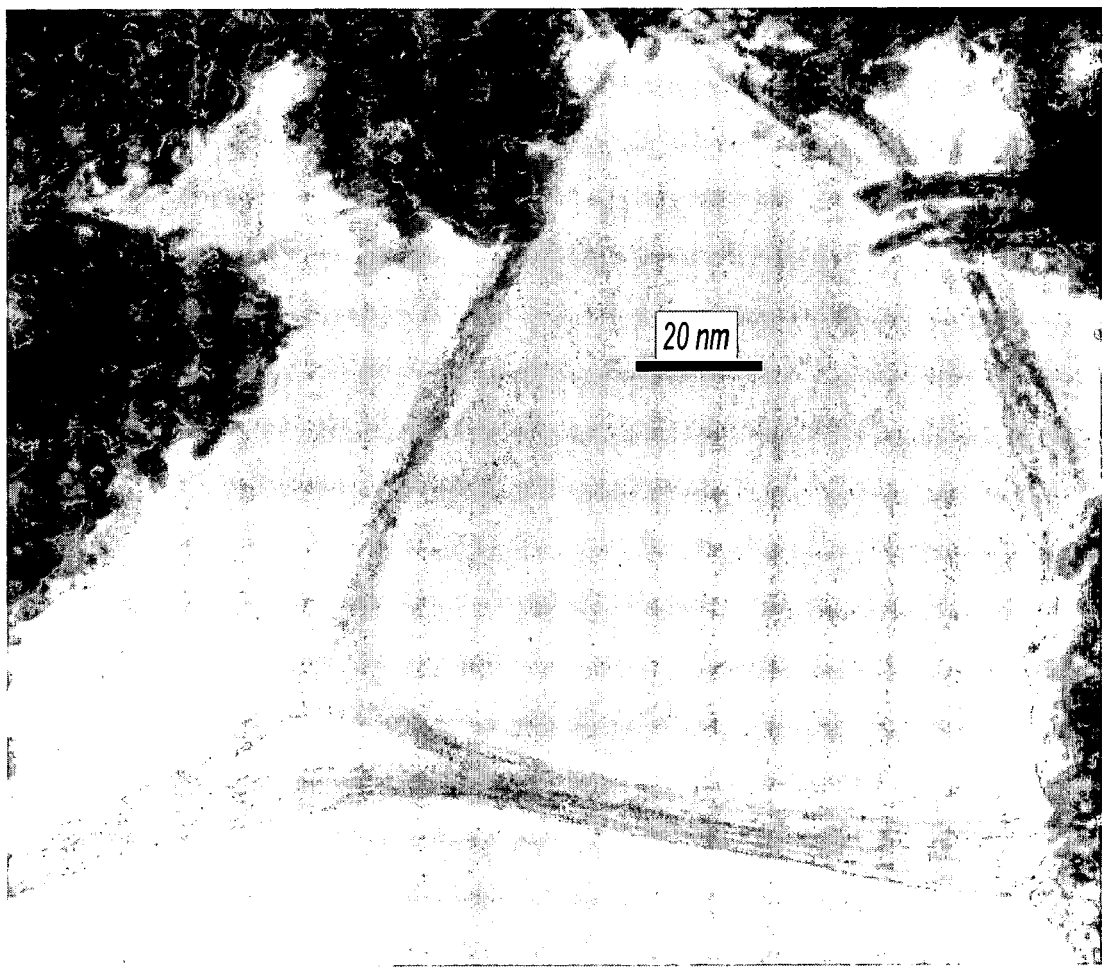
FIG. 1 contains TEM images of SWNTs synthesized at 900° C. on base of (a)—single metallic catalysts (Fe: $Al_2O_3$=1:16) and (b)—on base of bimetallic catalysts (Fe: Mo:$Al_2O_3$=1: 0.2:16)

The present invention is directed towards a process of producing SWNTs. This method comprises providing a catalyst that comprises an alumina support and at least one component selected from the group consisting of Fe oxide Fe/Mo oxide, reduced Fe and reduced Fe/Mo, and then growing SWNTs in an atmosphere comprising an inert gas by passing a gas that comprises methane over the catalyst at a temperature and for a time sufficient to grow SWNTs. Preferably, only one component is used. The present invention is also directed towards a SWNT produced by using the above described process. The invention is also directed towards a catalyst for producing SWNTs, wherein the catalyst comprises an alumina support and at least one (preferably one) component selected from the group consisting of reduced Fe, reduced Fe/Mo, Fe oxide, and Fe/Mo oxide.

While the atmosphere used in the method is preferably inert, it is even more preferred that the inert gas be argon. Additionally, it is preferred that argon be used as the inert gas with which the methane is mixed.

Additionally, the temperatures at which the SWNTs may be grown are dependent upon the component used in the catalyst. If the catalyst comprises Fe/Mo oxide, then the temperature is preferably more 600° C., but less than 900° C. Even more preferably, it is about 680° C. or higher. When the catalyst comprises reduced Fe, it is preferred that the temperature remain higher than 600° C., preferably about 680° C. or higher, but less than 900° C. Additionally, when the catalyst comprises reduced Fe/Mo, it is preferred that the temperature be higher than 600° C., preferably about 680° C. or higher, but less than 900° C. Finally, if the catalyst comprises Fe oxide, it is preferred that the temperature be more than 800° C., but less than 900° C.

Further, it is preferred that when the component of the catalyst is selected from the group consisting of reduced Fe or Fe oxide, the ratio of Fe to alumina is about 1-8:1-24 by weight percent. It is even more preferred that the ratio be about 1:16. If the component of the catalyst is selected from the group consisting of reduced Fe/Mo or Fe/Mo oxide, the ratio of Fe:Mo:alumina is preferred to be about 1-8:0.01-0.5:1-24. It is even more preferred that the ratio be about 1:0.2:16.

In a preferred embodiment of the process, the methane is applied at a rate of 40-100 cc/min and the inert gas that the methane is mixed with is applied at 300-400 cc/min. It is additionally preferred that the SWNTs are grown for a time of 15-120 minutes. It is even more preferred that the time be about 90 minutes in length.

Another embodiment of the present process allows for the reduction of a Fe oxide or a Fe/Mo oxide prior to the formation of the SWNTs. This step involves reducing a Fe oxide or a Fe/Mo oxide component with a gas capable of reducing the Fe oxide component or the Fe/Mo oxide component to form a respective reduced Fe or a reduced Fe/Mo component. This step takes place prior to the formation of the SWNTs in the inert atmosphere. Preferably, it occurs after the Fe oxide or the Fe/Mo oxide is loaded onto the alumina substrate. Also, the gas used is, preferably, an $H_2$/He mix. It is also preferred that the reducing gas be applied at a rate of 10-1000 cc/min, preferably about 100 cc/min, of 10:90 wt % $H_2$/He gaseous mix. However, the ratio of the $H_2$/He gaseous mix may be in the range of about 1-20:80-99 wt %. It is also preferred that the gas be applied to the Fe or Fe/Mo oxide for 30 minutes-30 hours at a temperature in the range of 300-600° C. It is even more preferred that the gas be applied for a time of about 10-20 hours at about 500° C.

EXAMPLE 1

Aluminum oxide—supported (Fe) or (Fe/Mo) catalysts with different molar ratios were prepared by adding $Fe(NO_3)_3.9H_2O$ or $Fe_2(SO_4)_3.5H_2O$ and $(NH_4)_6Mo_7O_{24}.4H_2O$ methanol/aqueous solutions into methanol solutions containing ~2 μm diameter $Al_2O_3$ particles. The mixture was stirred for about 1 hour to produce a homogenous catalyst. The solvent was then evaporated and the cake heated to 90-100° C. for 3 hours. After grinding with an agate mortar, the fine powders were calcined for 1 hour at 400-500° C. and then ground again before loading into the CVD apparatus.

EXAMPLE 2

The catalyst compositions were confirmed using energy dispersive X-ray electron dispersion spectra (EDX) analysis. The apparatus for the CVD growth of SWNT used in this work consisted of a quartz tube flow reactor (38 mm i.d. and 90 cm long) located in a three-zone horizontal tube furnace. Catalyst samples (30-80 mg) were placed in a quartz boat at the center of the reactor tube in the furnace. After reduction of the Fe/Mo oxide catalyst in a 100 cc/min flow of 10% $H_2$/90% He (99.9%) at 500° C. for 10-20 hours, the gases were replaced by argon (99.99%) and the temperature was raised at ~10° C./min to the growth temperature.

EXAMPLE 3

SWNTs were grown by passing a mixture of methane (40-100 cc/min) diluted in argon (300-400 cc/min) over the catalyst at a temperature in the range 680-900° C. for 30-90 min. The reactor was then allowed to cool to room temperature with argon gas flowing. The product was then weighed to determine the carbon yield of the CVD process. Yield is defined as $(m_f-m_o)/m_o$, where $m_f$ and $m_o$ are, respectively, the final mass of the catalyst with carbon deposit and the initial mass of the catalyst. It should be noted that not all the carbon mass was present in the form of SWNTs. Raman scattering results from the SWNTs were used to measure the tube yield.

The Fe and Mo salts (99.999%) and alumina support (99.9%) were obtained from Alfa AESAR company. The gases used in this work, methane (99.99%), argon (99.99%) and 10% $H_2$/90% He (99.9%), were obtained from MG Industries. Reactor gas flow was controlled by use of electronic mass flow controllers (BOC Edwards).

EXAMPLE 4

The structure of carbon materials was studied with a transmission electron microscopy (JEOL JEM 1200EX) at 120 KV. Raman scattering spectra were collected using a Bomem DA3+FT Raman Spectrometer (Hartman and Braun) using Nd:YAG laser excitation (λ=1064.5 nm) at 0.4 mW power. A JY-ISA HR460 single grating spectrometer with CCD detector with a "supernotch" filters (Kaiser Optical) was used to collect Raman spectra with 488 nm excitation from an Argon ion laser.

Figure 1B:
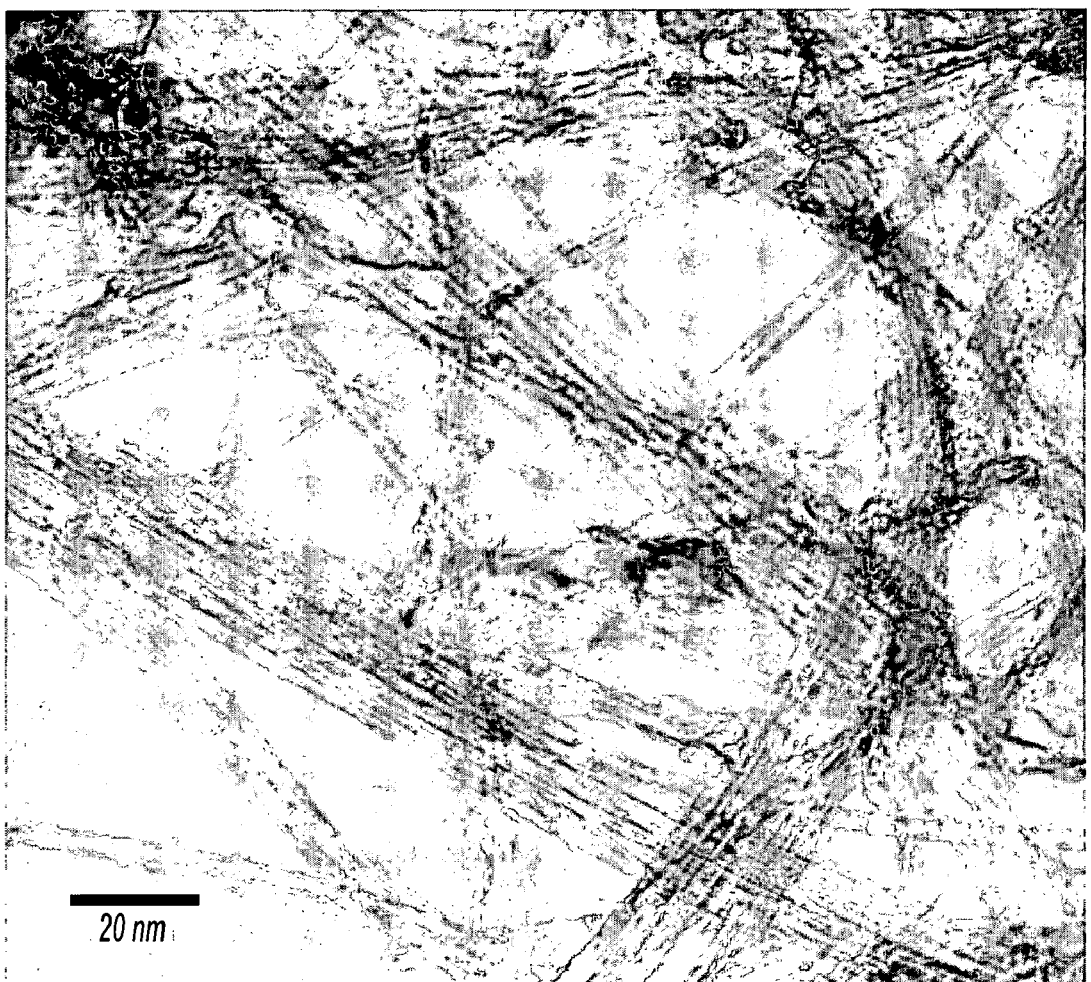

FIG. 1 displays TEM images of SWNTS grown at 900° C. in $CH_4$ for 90 min on an Fe oxide catalyst, Fe:$Al_2O_3$=1:16 (FIG. 1a) and Fe/Mo oxide catalyst (Fe:Mo:$Al_2O_3$=1: 0.2: 16) FIG. 1b, respectively. The tube bundles shown protrude away from the alumina support. The Fe and Fe/Mo catalysts were not reduced under hydrogen gas before the CVD growth of SWNTs. However, in both cases, an abundance of SWNTs was observed. The images of SWNTs bundles produced with Fe-oxide exhibit an average bundle diameter of 10 nm. At high resolution, no amorphous carbon could be detected on the bundles. TEM images taken on the Fe/Mo oxide catalyst (FIG. 1b) show many individual SWNT with an average diameter of ~1.5 nm. The bimetallic Fe/Mo oxide catalyst produced a relatively higher carbon yield (21 wt %) than single Fe-oxide (16 wt %). It was found that decreasing the growth temperature from 900° C. to 680° C. produced SWNTs only on Fe/Mo oxide; no tubes were observed to grow on Fe-oxide at 680° C.

EXAMPLE 5

Figure 2A:
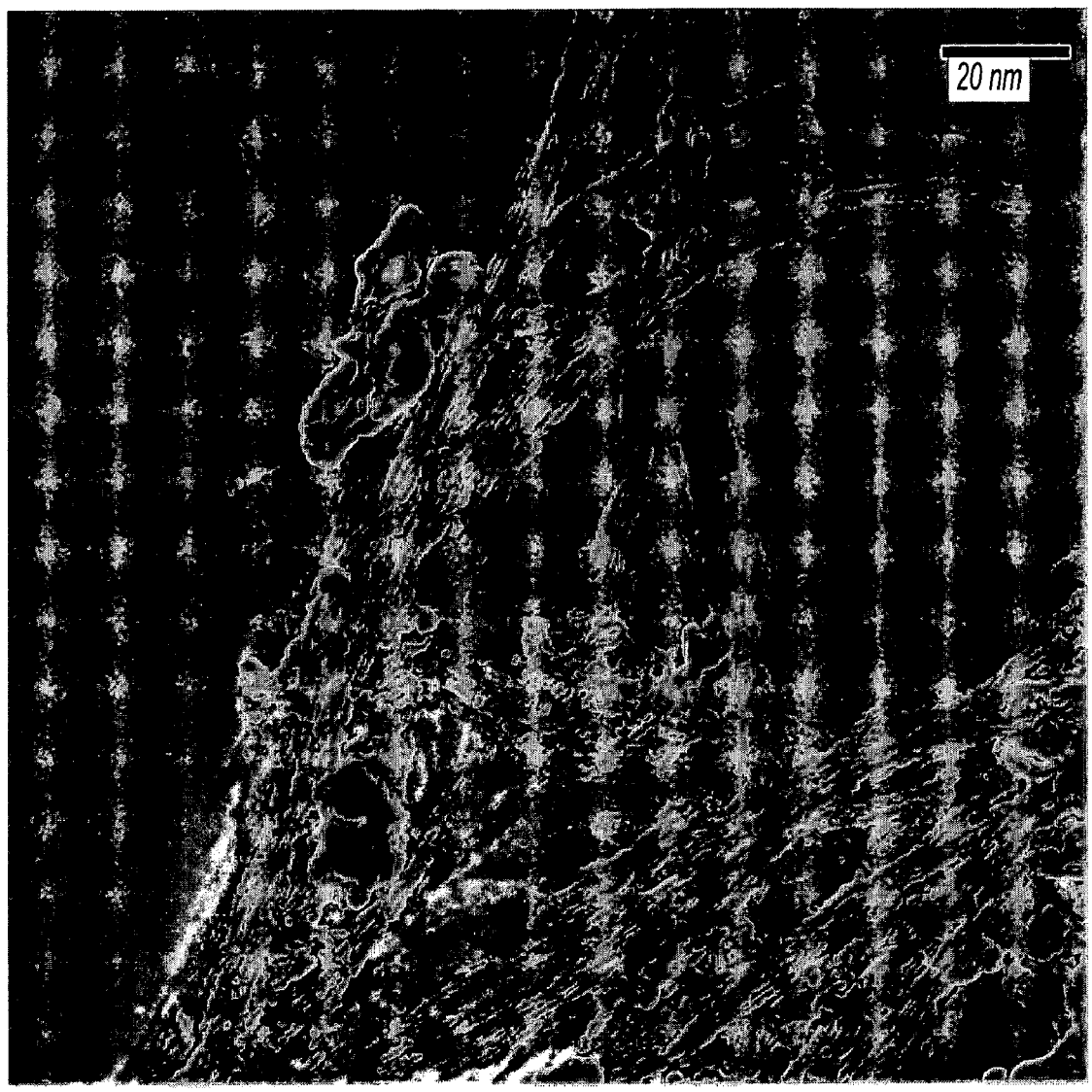
FIG. 2 contains TEM images of SWNTs synthesized at 680° C. on base of (a)—single metallic catalysts (Fe: $Al_2O_3$=1:16) and (b)—on base of bimetallic catalysts (Fe: Mo:$Al_2O_3$=1: 0.2:16), preliminary reduced by 10% $H_2$/90% He gases.
Figure 2B:
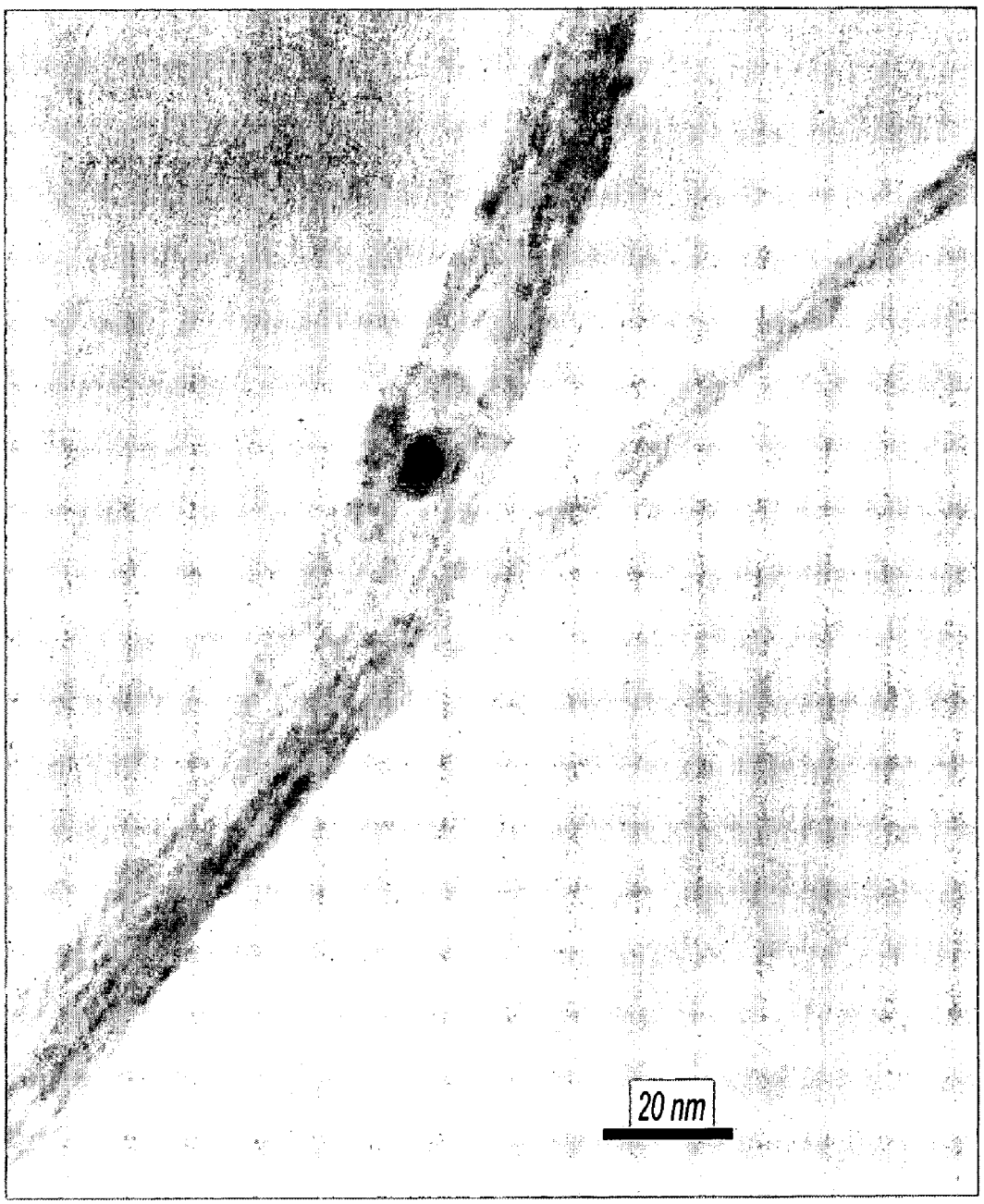

A second series of experiments was conducted using the same Fe and Fe/Mo catalysts but they were first reduced under flowing 10% $H_2$/90% He gas. Fe and Fe/Mo catalysts were loaded in different concentrations on the alumina support and SWNT growth was studied for temperatures in the range 600-900° C. The reduction in $H_2$ was found to activate the Fe catalyst, producing SWNTs at 680° C. FIG. 2 shows TEM images of SWNTs synthesized at 680° C. for 90 min with the reduced Fe (FIG. 2a) and Fe/Mo (FIG. 2b) catalysts. In most of the images, only the "free" end of either an individual tube or a bundle of tubes can be observed. The other end is buried in the support and presumably is terminated on a catalyst particle. Importantly, no metal particles at the end of the tubes were observed and the tube ends appeared to be closed.

Figure 3:
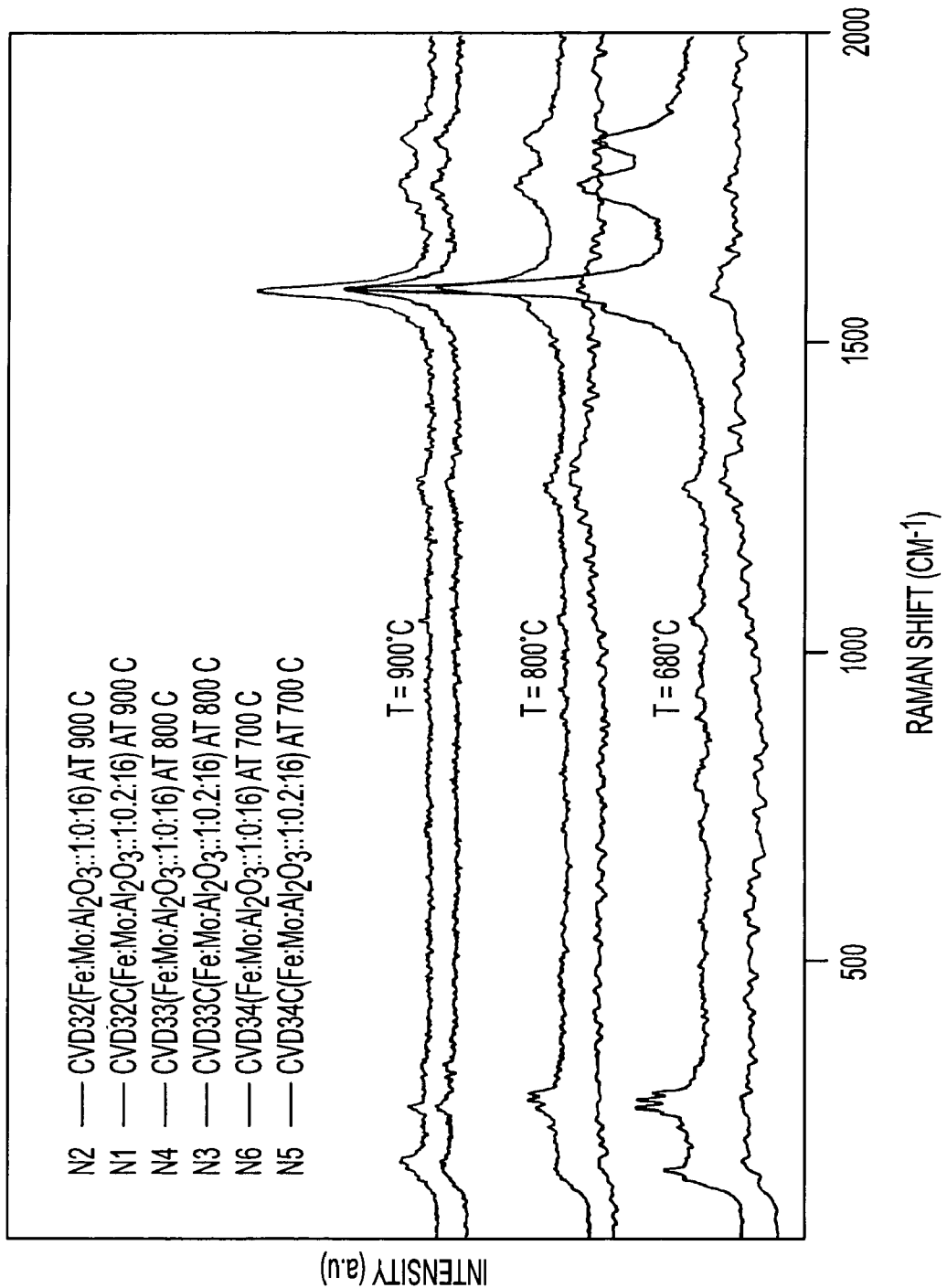
FIG. 3 contains Evolution of Raman spectra of samples growth on base of single and bimetallic catalysts at different temperature without preliminary reduction of catalysts.
Figure 4:
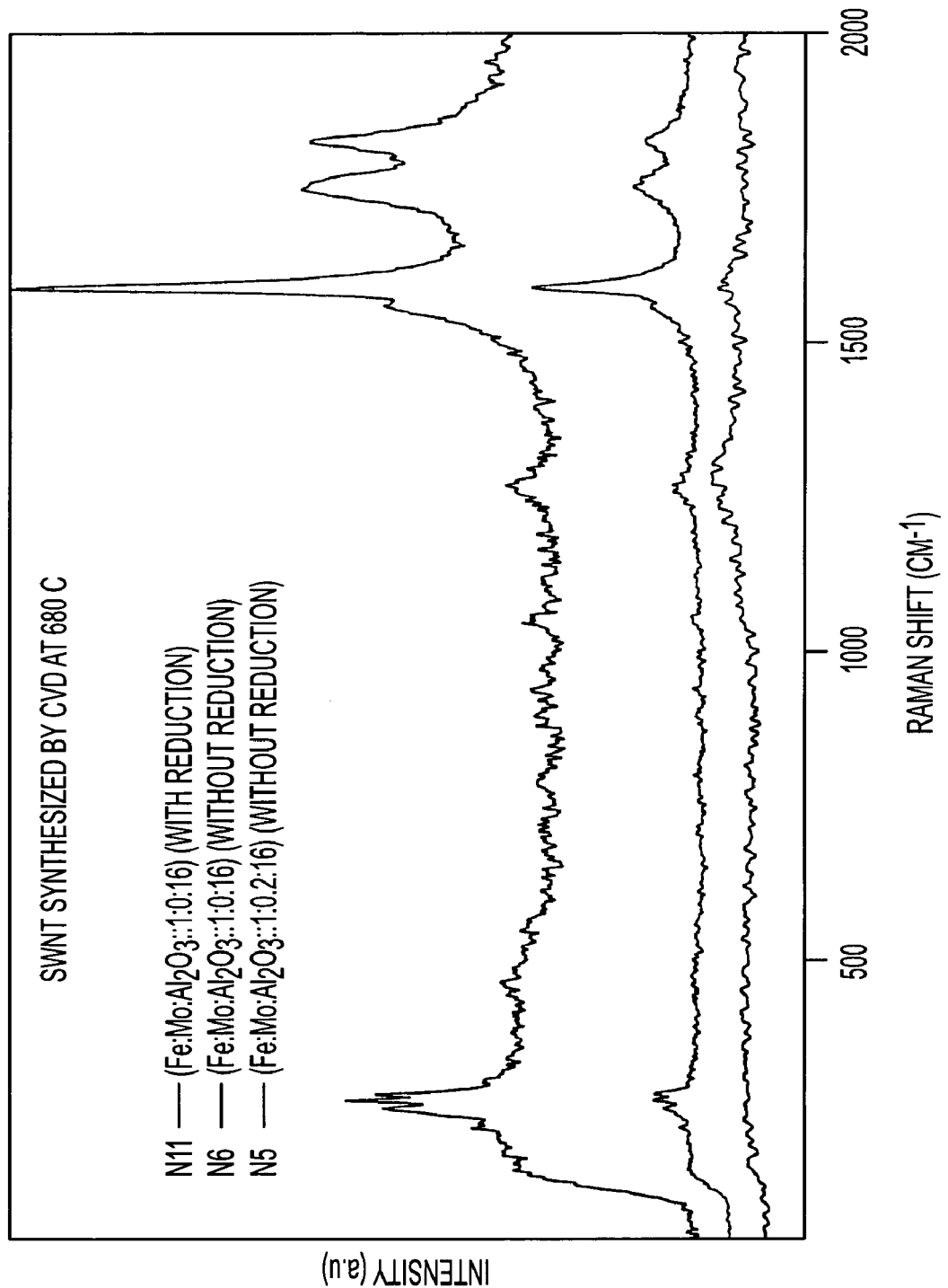
FIG. 4 contains Raman spectra of the carbon materials synthesized on base of single/bimetallic catalysts, with and without preliminary reduction.

The evolution of the Raman spectrum with growth temperature for the carbon materials produced with metal oxide Fe and Fe/Mo catalysts is shown in FIG. 3a. Most of the spectra (FIGS. 3a and b) exhibit the prominent high frequency tangential band (T-band) of SWNTs at ~1591 cm$^{-1}$, verifying the presence of SWNTs in each of the samples. The presence of the radial breathing bands in the samples occur in the range 100 cm$^{-1}$<$\omega_r$<300 cm$^{-1}$. For SWNT bundles, it has been shown that $\Omega_r$ is related to the diameter of the SWNTs via $\Omega_r$=12+224(cm$^{-1}$.nm)/d. The additional constant (12 cm$^{-1}$) in the relation is present to account for the tube-tube interactions in a bundle. From the measured $\omega_r$, the diameters for the tubes which have been resonantly excited have been computed to be 488 nm and 1064 nm. Table 1 displays the tube diameters observed for tubes produced at various temperatures from Fe and Fe/Mo catalysts without reduction in $H_2$. From the characteristic Raman spectra of SWNTs, it can be concluded that tubes were grown only at ~900° C. with Fe catalyst in oxide form, i.e., without the in situ reduction in $H_2$. Furthermore, the presence of Mo coexisting with the Fe decreased the SWNTs growing temperature to 680° C., a dramatic improvement.

FIGS. 3a and 3b show Raman spectra collected using 488 nm and 1064 nm excitation wavelengths. The spectra give a clear indication of the effectiveness of catalyst in oxidized or reduced form and operating at the temperatures indicated. For example, FIG. 3a permits the following of the Raman spectra of the series of sample produced with oxide catalyst (Fe, Fe/Mo). From the loss of Raman intensity at the "T-band" (1591 cm$^{-1}$), we see that Fe-oxide becomes inactive at 800° C. Raman data for FE-oxide collected at temperatures below 800° C. are similar to the 800° C. spectra, i.e., no evidence for tubes was observed. However, if Mo is added at the ratio Fe/Mo (5:1) the Fe/Mo oxide catalyst remains active all the way to T=680° C., as observed in the spectra of FIG. 3a. At 600° C. it was found that Fe/Mo oxide was no longer active. FIG. 3b also refers to Fe/Mo oxide catalyst, but Raman spectra were collected using 488 nm excitation. Consistent with the 1064 nm data in FIGS. 3a and 3b, it was found that the tubes resonantly scattered by 488 nm also show that Fe/Mo oxides is active down to 680° C. The spectra at the bottom of FIG. 3b (left panel) is included to show the Raman bonds of the catalyst support ($Al_2O_3$) in the region of the radial SWNT bands. As can be seen in FIG. 3b, when the growth temperature increases, radial bands appear at higher frequency, indicating the formation of small diameter tubes (Table 1). Furthermore, the diameter distribution (as seen via $\omega_r$) broadens with increasing temperature. Also shown in FIG. 3b (right panel) is the high frequency region associated with the SWNT T-band. The notch in the T-band at ~1575 cm$^{-1}$ is seem to deeper at the growth temperature of 800° C. The depth of this notch increases with decreasing Raman line width. The best quality samples (small wall disorder, small amount of other sp$^2$ carbons) always show a deep notch similar to the 800° C. sample. The broad band at ~1350 cm$^{-1}$ in the left hand panel of FIG. 3b is identified with disorder-induced scattering ("D"-band). As expected, when the notch is deep, the D-band is weak.

EXAMPLE 6

Figure 5:
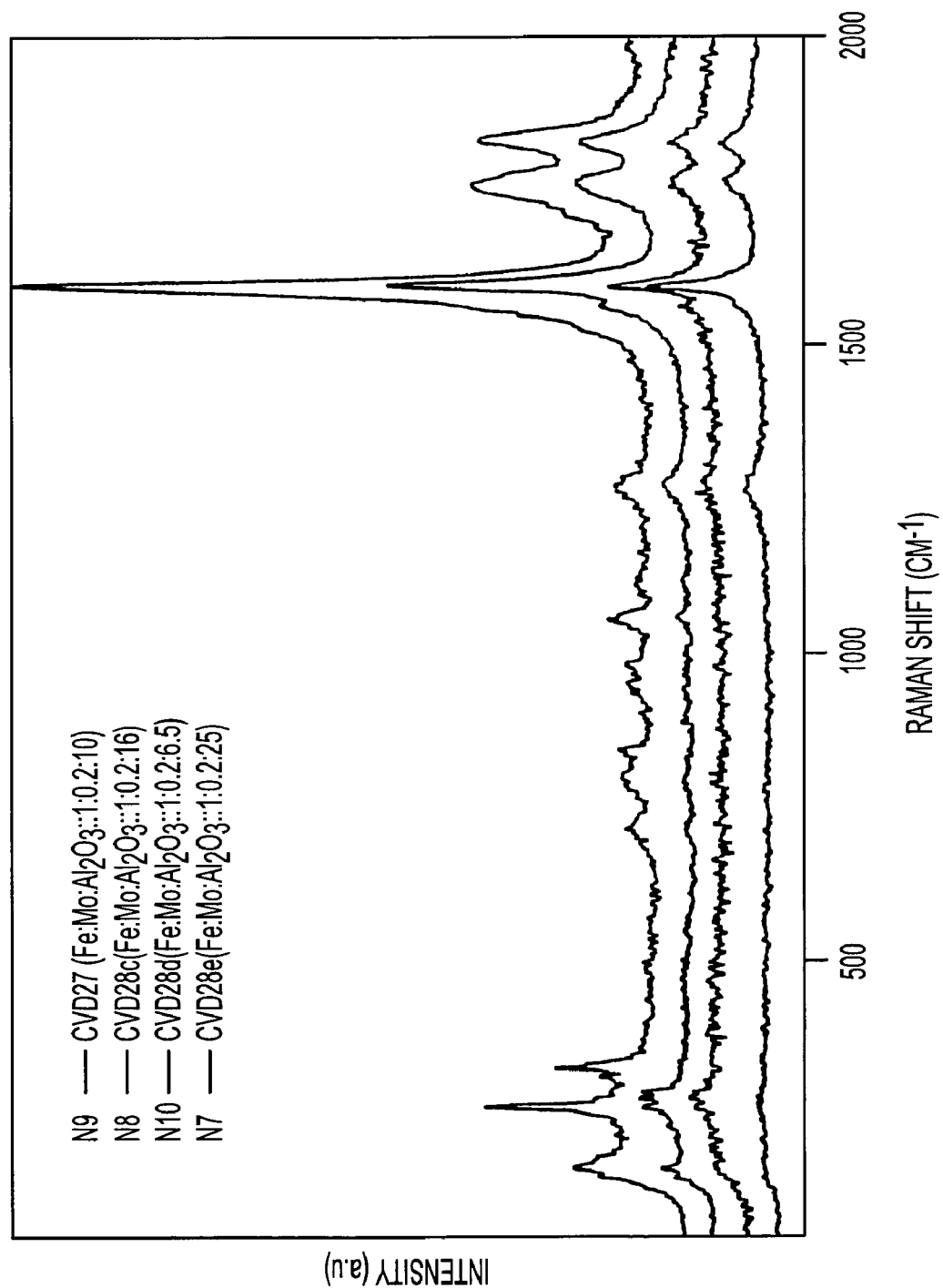
FIG. 5 contains Raman spectra for the samples synthesized at 680° C. with the different concentration of $Al_2O_3$ support material.

Finally, the effect of the catalyst loading on the SWNT produced was examined, using Raman Scattering from the tubes as a qualitative probe. FIG. 5 shows Raman spectra for four samples synthesized at temperature 680° C. using Fe/Mo (1:0.2) on $Al_2O_3$ at the loading indicated in the figure. The intensity of the 1591 cm$^{-1}$ SWNT band can be taken as an estimate for the yield of tubes produced in that sample. All five spectra exhibited the prominent tangential SWNT band at 1591 cm$^{-1}$, verifying the presence of SWNTs in each of the samples. The radial breathing frequencies and calculated tube diameters for the four catalyst loadings are listed in Table 2. Based on results from one excitation wavelength (Table 2 sample N 7, 8, 9) it appears that lower catalyst loading seems to eliminate tubes with larger diameters from the product. It has been assumed that this is connected with redistribution of energy necessary for growing of SWNTs.

EXAMPLE 7

Finally, the concentration of Mo relative to Fe on the support has been varied. This study was made at 680° C. The max yield of SWNTs synthesized at 680° C. using the activated in $H_2$ catalyst was observed for Fe:Mo:$Al_2O_3$=1:0, 2:16 his yield was found to be 18 wt %.

TABLE 1

The Raman radial breathing (excitation-$\lambda$ = 1064.5 nm) modes and corresponding tube diameters for the samples synthesized at different temperature without preliminary reduction of catalysts

| Sample N | Catalyst Fe:Mo:$Al_2O_3$ | Temp. [° C.] | Raman Radial Breathing Mode Peaks [cm$^{-1}$] | Tube Diameter [nm] $\omega$ = 12 + 224/d |
|---|---|---|---|---|
| 1 | 1:0.2:16 | 900 | 165.5; 273.6; | 1.46; 0.86 |
| 2 | 1:0:16 | 900 | 165.5; 273.6 | 1.46; 0.86 |
| 3 | 1:0.2:16 | 800 | 165.5; 230; 260; 273.6; 283.8 | 1.46; 1.03; 0.9; 0.86; 0.82 |
| 4 | 1:0:16 | 800 | No peaks | |
| 5 | 1:0.2:16 | 680 | 165.5; 230; 260; 273.6; 283.8 | 1.46; 1.03; 0.9; 0.86; 0.82 |
| 6 | 1:0:16 | 680 | No peaks | |

TABLE 2

The Raman radial breathing (excitation-$\lambda$ = 488 nm) modes and corresponding tube diameters for the samples synthesized at low temperature with preliminary reduction of catalysts using 10% $H_2$/90% He gases at 500° C. for 20 hours

| Sample N | Catalyst Fe:Mo:$Al_2O_3$ | Temp. [° C.] | Raman Radial Breathing Peaks [cm$^{-1}$] | Tube Diameter [nm] $\omega$ = 12 + 224/d |
|---|---|---|---|---|
| 7 | 1:0.2:25 | 680 | 156; 172; 180; 201; | 1.55; 1.4; 1.33; 1.18 |
| 8 | 1:0.2:16 | 680 | 162; 177; 180; 203; 258 | 1.49; 1.36; 1.33; 1.06; 0.91 |
| 9 | 1:0.2:11 | 680 | 165; 177; 180; 203; 258 | 1.46; 1.36; 1.33; 1.06; 0.91 |
| 10 | 1:0.2:9 | 680 | 177; 203; 258 | 1.38; 1.17; 0.91 |
| 11 | 1:0.2:6,5 | 680 | 172; 200 | 1.41; 1.19 |

We claim:

1. A method of producing single wall carbon nanotubes at temperatures below 800° C., wherein said method comprises:
   (a) providing a catalyst comprising an alumina support and Fe/Mo oxide; and
   (b) growing in an inert atmosphere, single wall carbon nanotubes by passing a gas comprising methane over the catalyst at a temperature that is more than 600° C. and less than 800° C. and for a time sufficient to grow single wall carbon nanotubes.

2. The method of claim 1, wherein the ratio of Fe:Mo:alumina in the catalyst is about 1:0.2:16 by weight percent.

3. The method of claim 1, wherein the ratio of Fe:Mo:alumina in the catalyst is about 1-8:0:01-0.5:1-24 by weight percent.

4. The method of claim 1, wherein the ratio of Fe:Mo:alumina in the catalyst is about 1-5:0.01-0.5:1-24 by weight percent when the component is Fe/Mo oxide.

5. The method of claim 1, wherein the time is in a range of 15-120 minutes.

6. The method of claim 5, wherein the time is about 90 minutes.

7. The method of claim 1, wherein the methane gas is diluted in an inert gas.

8. The method of claim 7, wherein the methane is applied at 40-100 cc/mm and the inert gas is applied at 300-400 cc/mm.

9. The method of claim 7, wherein the inert gas is argon.

10. A method of producing single wall carbon nanotubes, the method comprising applying a hydrocarbon gas to a catalyst comprising Fe/Mo oxide at a temperature in the range of 600° C. to about 680° C. to form the single wall carbon nanotubes.

11. A method of producing single wall carbon nanotubes at temperatures below 800° C., wherein said method comprises: (a) providing a catalyst comprising Fe/Mo oxide, and (b) growing in an inert atmosphere, single wall carbon nanotubes by passing a hydrocarbon gas over the catalyst at a temperature below 800° C. and for a time sufficient to grow single wall carbon nanotubes.

12. The method of claim 11, wherein the yield of single wall carbon nanotubes is at least 16 weight percent.

13. The method of claim 11, wherein the ratio of Fe:Mo:alumina in the catalyst is about 1-8:0:01-0.5:1-24.

14. The method of claim 11, wherein the ratio of Fe:Mo:alumina in the catalyst is about 1:0.2:16 by weight.

* * * * *